Nov. 9, 1943.   W. W. McMAHAN   2,334,110
METHOD OF FILLING TIRES
Filed July 5, 1941.

Inventor
William W. McMahan

By

Attorney

Patented Nov. 9, 1943

2,334,110

UNITED STATES PATENT OFFICE 2,334,110

METHOD OF FILLING TIRES

William W. McMahan, Akron, Ohio, assignor to Wingfoot Corporation, Akron, Ohio, a corporation of Delaware Application July 5, 1941, Serial No. 401,215

1 Claim. (Cl. 152—330)

This invention relates to a method of filling a tire with water. The tire may contain an inner tube, or it may be a tubeless tire, such as that described in Zimmerman and McMahan United States Patent No. 2,237,207.

According to this invention the tire, with the valve at the highest point, is filled from a hose, through a valve, substantially as full as possible with water under pressure. The water hose is then disconnected, and the water is drained from the tire until the tire is only filled to substantially the level of the valve. Then the hose is reconnected, and water is again introduced into the tire under pressure until the pressure in the tire exceeds the desired operating pressure. In water-filled tractor tires, for example, this operating pressure may not exceed thirty pounds per square inch. The pressure in the tire at this step of the process is therefore brought into excess of thirty pounds per square inch. The hose is then again disconnected and water is drained from the tire until the desired operating pressure is obtained. The drainage of water is then discontinued. If the available water pressure is below that desired in the tire, the tire may be filled with water under the available pressure and then by the addition of only a small amount of water by a hand pump the water may be brought to the desired pressure.

By placing the tire under a greater pressure than that eventually used and then reducing the pressure to that which is to be used the tire is stretched somewhat and then relaxed. If this is not done, and the pressure during inflation never exceeds the final pressure, the tire will stretch more readily in use, and stretching, of course, causes a reduction of the pressure in the tire. It is therefore evident that by using a pressure greater than the final pressure during inflation the danger of the tire becoming underinflated soon after being put into use is reduced.

Figure 1:
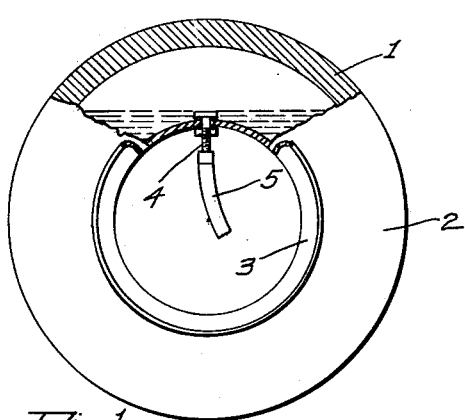
Figure 4:
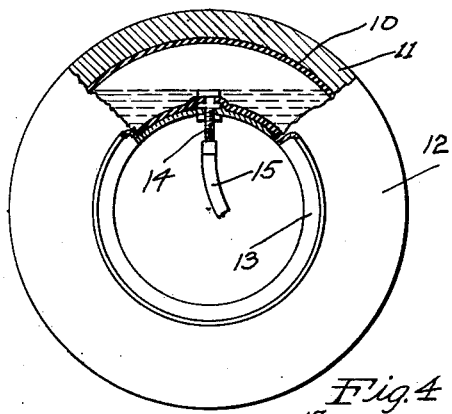
Figure 2:
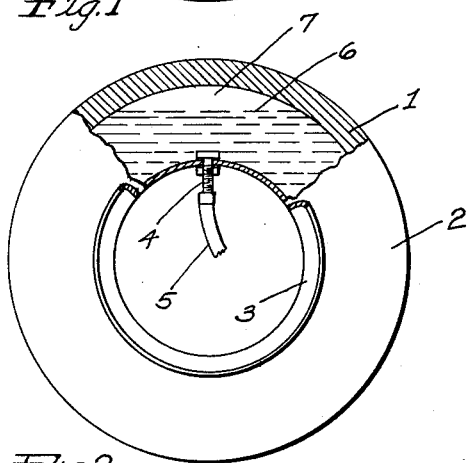
Figure 5:
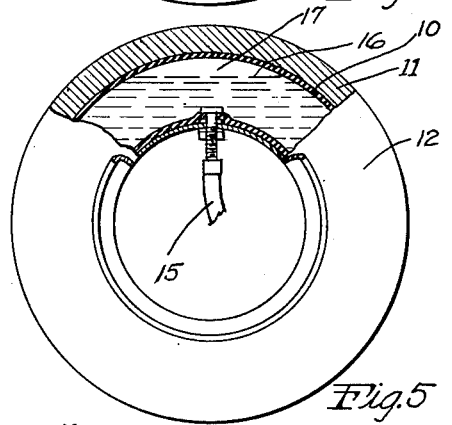
Figure 3:
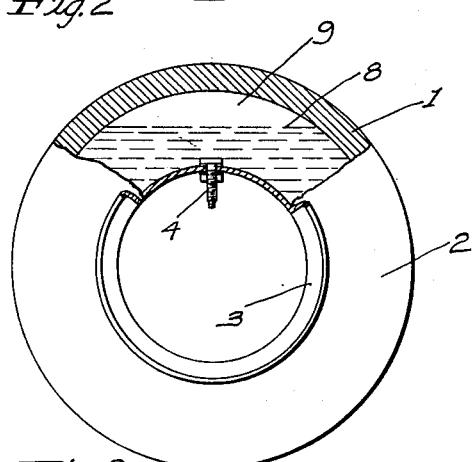
Figure 6:
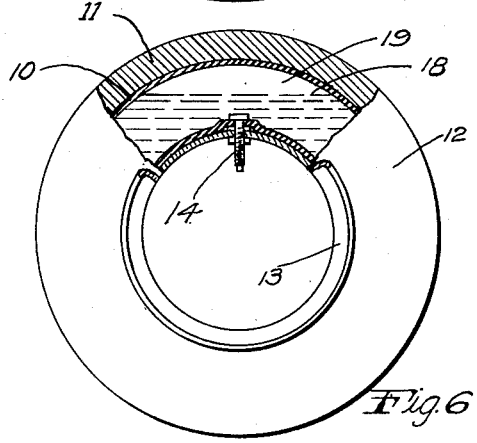

The invention will be further described in connection with the accompanying drawing. Figs. 1, 2 and 3 show a tubeless tire at various stages in the process of filling. Figs. 4, 5 and 6 show a tire with an inner tube in the same stages of the process.

In Figs. 1, 2 and 3 the tread 1 of the tire 2 is shown as being relatively thick. This is because the tires most commonly filled with water are tires for farm tractors or other farm equipment, and the treads of such tires are thick, usually comprising heavy lugs. The details of such lugs are not shown in the drawing. The tire is directly mounted on the rim 3, for example, as described in the aforesaid Zimmerman and McMahan patent. The valve 4 which is fastened directly on the rim 3 by a water-tight connection may be a valve of the type now in use, or any suitable valve may be employed. The core of the valve may be removed while water is being introduced into the tire.

As described in the Zimmerman and McMahan patent, the final steps in seating the tire on the rim include inflating the tire with air under pressure and then replacing the air with water. Various special devices and means for use in completely filling the tire with water have been devised. When the tire is filled with water according to this invention no such device need be used. The tire is first only partially filled with water, e. g., ninety-five per cent, and as the air escapes (as it will during use) the desired pressure is maintained by the addition of water until eventually the tire is completely filled with water. The tire may be coated on the interior with a gum coat to prevent seepage of water through the tire.

Water is usually supplied through city lines, etc., at about forty pounds pressure. The invention is not limited to this pressure, although a pressure of at least about twenty pounds should be used. Pressures above or below forty pounds may be employed. The invention will be more particularly described in connection with the use of water under forty pounds pressure in filling a tubeless tractor tire of the size known in the industry as an 11–38.

If the tire is filled with air under pressure, the air pressure is first reduced until about atmospheric. Then the water hose 5 is connected, and water under forty pounds pressure is supplied until the pressure within the tire equals about forty pounds. This brings the water level above the level of the valve. The water hose 5 is then disconnected, and water is drained from the tire until the water is approximately at the level of the valve as shown in Fig. 1, and the air pressure in the tire becomes nearly atmospheric. The water hose is then connected again, and water is introduced under pressure until the pressure approximates forty pounds. This brings the water to the level 6 shown in Fig. 2. Since the normal operating pressure in this type of tire on a farm tractor is twelve or fifteen pounds, some air or water must be removed from the tire before use. This is done by disconnecting the hose. The air under forty pounds pressure in the space 7 of the tire as shown in Fig. 2 forces water out through the valve. In this way the amount of water in the tire is reduced to the level 8 to bring the pressure in the tire down to the operating pressure. The pressure in the air space 9 and throughout the tire is then, for example, fifteen pounds. At this point the tire is about 95% filled with water. When the tire is filled to the level 6 shown in Fig. 2 it is about 98% filled with water.

It will thus be seen that with an ordinary hose connection it is possible to fill the tire about 95% with water and have the tire under about twelve or fifteen pounds pressure, and this can be done very easily. As the tire is used the air space 9 will lessen due to leakage of air through the tire. There is substantially no loss of water whatever if the tire is seated tight on the rim. As air is lost the pressure is maintained by addition of water through the valve to bring the pressure back to the desired operating pressure. After several such additions of water the tire eventually becomes completely filled with water. Thereafter there is substantially no loss of pressure, since there is no longer any air in the tire and there is almost no loss of water whatever.

The filling of a tire equipped with an inner tube is not different in any substantial respect. Figs. 4, 5 and 6 show such a tire 11 equipped with an inner tube 10. The reference numerals in the last three drawings correspond with the figures in the earlier drawings, except that the digit 1 has been used in front of them. They indicate like parts, and the procedure is in all respects the same.

The water may contain calcium chloride or other salt to prevent freezing in cold weather.

What I claim is:

That method of filling a vehicle tire with liquid which includes the steps of supporting the tire in a vertical plane, turning the tire to locate the valve stem at its highest position, opening the valve stem so that the tire is filled with air under atmospheric pressure, passing liquid under pressure into the tire until the liquid fills the tire to a level vertically above the valve stem and at a pressure greater than the ultimate pressure to be used in the tire, opening the valve stem to bleed out liquid and thereafter air and to drop the pressure in the tire to atmospheric, again passing liquid into the tire until the said greater pressure has been established for a second time, and then bleeding only liquid out through the valve stem until the pressure in the tire has been dropped to the ultimate pressure to be used in the tire.

WILLIAM W. McMAHAN.